(12) United States Patent
Radhakrishnan et al.

(10) Patent No.: US 11,483,290 B2
(45) Date of Patent: Oct. 25, 2022

(54) DISTRIBUTION OF STATELESS SECURITY FUNCTIONS

(71) Applicant: Cisco Technology, Inc., San Jose, CA (US)

(72) Inventors: Saravanan Radhakrishnan, Bangalore (IN); Anand Oswal, Pleasanton, CA (US); Ashwin Kumar, Bangalore (IN); Paul Wayne Bigbee, Palo Alto, CA (US); Darrin Joseph Miller, Marysville, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 150 days.

(21) Appl. No.: 16/985,664

(22) Filed: Aug. 5, 2020

(65) Prior Publication Data

US 2021/0119971 A1   Apr. 22, 2021

Related U.S. Application Data

(60) Provisional application No. 62/923,986, filed on Oct. 21, 2019.

(51) Int. Cl.
*H04L 29/06* (2006.01)
*H04L 9/40* (2022.01)

(52) U.S. Cl.
CPC ........ *H04L 63/0263* (2013.01); *H04L 63/101* (2013.01); *H04L 63/20* (2013.01)

(58) Field of Classification Search
CPC ... H04L 63/0263; H04L 63/101; H04L 63/20; H04L 63/145; H04L 63/1466
USPC .............................................................. 726/1
See application file for complete search history.

(56) References Cited

U.S. PATENT DOCUMENTS

| | | |
|---|---|---|
| 9,369,431 B1 | 6/2016 | Kirby et al. |
| 9,787,641 B2 | 10/2017 | Bansal et al. |
| 10,021,070 B2 | 7/2018 | Teng et al. |
| 2017/0374106 A1 | 12/2017 | Hamou et al. |
| 2018/0191766 A1* | 7/2018 | Holeman ............ H04L 63/1441 |

OTHER PUBLICATIONS

"Sophos XG Firewall Release Notes," Sophos Limited, Jun. 9, 2020.
Chen et al., "Using NetFPGA To Offload Linux Netfilter Firewall," Researchgate, Jan. 2010.
(Continued)

*Primary Examiner* — Longbit Chai
(74) *Attorney, Agent, or Firm* — Polsinelli

(57) ABSTRACT

Systems and methods are provided for receiving, at a network device, a first set of rules from a security controller of an enterprise network, the first set of rules being different from a second set of rules provided to a firewall by the security controller, implementing, at the network device, the first set of rules received from the security controller, generating, at the network device, a first log including metadata based on the first set of rules, the first log being generated on a per flow basis, notifying, at the network device, a NetFlow of the first log including the metadata of the first set of rules, and providing, from the network device, the first log to a cloud-log store by the NetFlow of the network device, the cloud-log store receiving the first log from the network device and a second log from the firewall.

20 Claims, 8 Drawing Sheets

(56) References Cited

OTHER PUBLICATIONS

International Search Report and Written Opinion from the International Searching Authority, dated Feb. 11, 2021, 11 pages, for corresponding International Patent Application No. PCT/US2020/055097.

* cited by examiner

DISTRIBUTION OF STATELESS SECURITY FUNCTIONS

CROSS-REFERENCE TO RELATED APPLICATIONS

This application claims priority to U.S. Provisional Patent Application No. 62/923,986, filed on Oct. 21, 2019, the entire contents of which are incorporated by reference herein.

TECHNICAL FIELD

The subject matter of this disclosure relates in general to the field of computer networking, and more particularly, to systems and methods for leveraging a network to implement stateless aspects of a security policy without loss in capability, scale, and/or logging.

BACKGROUND

The enterprise network landscape is continuously evolving. There is a greater demand for mobile and Internet of Things (IoT) device traffic, Software as a Service (SaaS) applications, and cloud adoption. In addition, security needs are increasing and certain applications can require prioritization and optimization for proper operation. As this complexity grows, there is a push to reduce costs and operating expenses while providing for high availability and scale.

Conventional WAN architectures are facing major challenges under this evolving landscape. Conventional WAN architectures typically consist of multiple Multi-Protocol Label Switching (MPLS) transports, or MPLS paired with Internet or Long-Term Evolution (LTE) links used in an active/backup fashion, most often with Internet or SaaS traffic being backhauled to a central data center or regional hub for Internet access. Issues with these architectures can include insufficient bandwidth, high bandwidth costs, application downtime, poor SaaS performance, complex operations, complex workflows for cloud connectivity, long deployment times and policy changes, limited application visibility, and difficulty in securing the network.

A typical firewall has many access control rules. Some of these firewalls are statically defined by the user, while some are dynamically added based on a decision of a security policy. Having these rules in the firewall includes disadvantages such as forcing a dependence on topology as all of the network traffic needs to be forced through the firewall. The network traffic has to be completely sent to the firewall before it is dropped. This is especially inefficient in cases where the security function is in a cloud because there are also Wide Area Network (WAN) bandwidth implications.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1A:
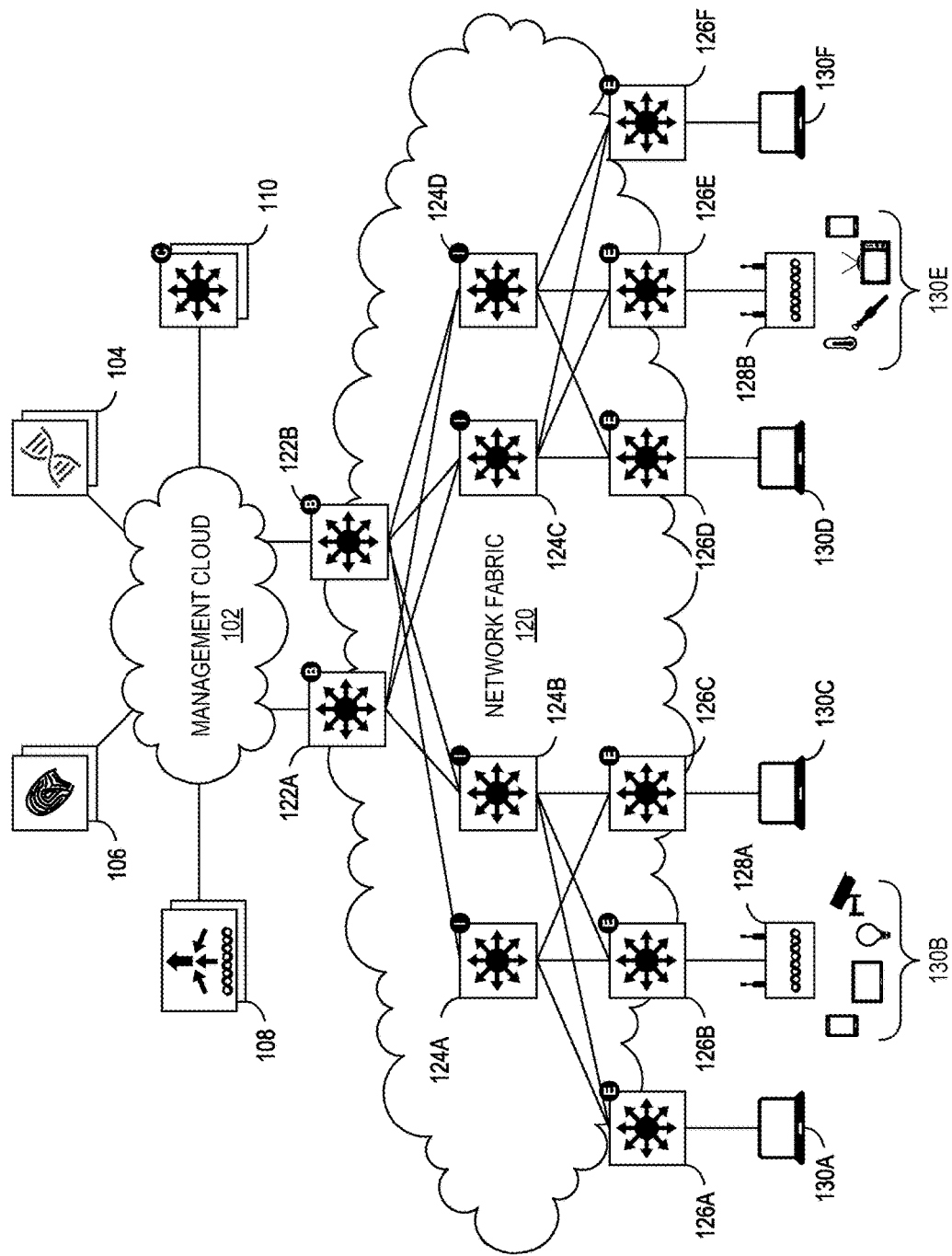
FIG. 1A illustrates an example of a physical topology for an enterprise network, in accordance with an embodiment of the present disclosure.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods provide for leveraging a network to implement stateless aspects of a security policy without loss in capability, scale, and/or logging. For example, systems and methods are provided for receiving, at a network device, a first set of rules from a security controller of an enterprise network, the first set of rules being different from a second set of rules provided to a firewall by the security controller, implementing, at the network device, the first set of rules received from the security controller, generating, at the network device, a first log including metadata based on the first set of rules, the first log being generated on a per flow basis, notifying, at the network device, a NetFlow of the first log including the metadata of the first set of rules, and providing, from the network device, the first log to a cloud-log store by the NetFlow of the network device, the cloud-log store receiving the first log from the network device and a second log from the firewall.

Example Embodiments

An example of a network architecture for implementing aspects of the present technology is described below. However, one of ordinary skill in the art will understand that, for the network architecture and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

Enterprise networks can be designed and deployed to provide wireless network access for general-purpose computing devices (e.g., servers, workstations, desktop computers, laptop computers, tablets, mobile phones, etc.) and things (e.g., desk phones, security cameras, lighting, HVAC, windows, doors, locks, medical devices, industrial and manufacturing equipment, and other IoT devices) (sometimes also referred to as clients, servers, hosts, computing systems, endpoints, electronic devices, user devices, User Equipment (UE) devices, etc.) within environments such as offices, hospitals, colleges and universities, oil and gas facilities, factories, and similar locations. With wireless network access, these devices can connect to private networks (e.g., campus or access networks, data centers, branch networks, etc.) and public networks (e.g., the Internet, Infrastructure as a Service (IaaS) networks, Platform as a Service (PaaS) networks, Software as a Service (SaaS) networks, other Cloud Service Provider (CSP) networks, etc.) without being tethered to a specific location. The wireless network access technologies can include Wireless Personal Area Networks (WPANs) (e.g., BLUETOOTH, ZIGBEE, Z-WAVE, etc.), WI-FI (e.g., Institute of Electrical Electronic Engineers (IEEE) 802.11x, such as 802.11a, 802.11h, 802.11g, 802.11n, 802.11ac, 802.11ax, etc.) or Wireless Local Area Networks (WLANs), and Wireless Wide Area Networks (WWANs) or cellular networks (e.g., 4G/LTE, 5G, etc.).

Another wireless network access technology that can be integrated by enterprise networks is Citizens Broadband Radio Service (CBRS) (sometimes also referred to as private LTE, private 5G, OnGo, etc.). CBRS operates in a 210 MHz wide spectrum of the 3.5 GHz band (e.g., 3550-3700 MHz frequency range in the United States), and thus CBRS is unlikely to interfere or be interfered with by WI-FI and cellular devices. For some devices, like life-sustaining medical equipment that need guaranteed, always-on connectivity or industrial IoT devices or other robots that have specific mobility requirements, CBRS can complement WI-FI, cellular, and other wireless networks.

WI-FI, cellular, and CBRS networks have different advantages and drawbacks relative to one another. Building a cellular network to provide ubiquitous, robust connectivity (e.g., backhaul links cannot be cut, cellular network infrastructure is often restored first after a disaster, etc.) to devices operating across vast distances can be a costly endeavor that relies on monthly and metered subscriptions to cover expenses. WI-FI network equipment can connect devices within the same general physical location, such as a home or a building, and is relatively inexpensive in comparison. In addition, WI-FI operates in unlicensed frequencies that do not require bidding for rights to use them. Mobile and cellular standards are also different from WI-FI in that a cellular device can require a significantly higher license cost for the technology itself. For example, WI-FI devices, which are based on IEEE standards, can have a per-device cost for associated licenses that is dramatically lower than for LTE/4G or 5G devices.

Cellular networks may be suitable for mobile usage in cases in which it can be critical for a user to have a consistent, persistent connection. For example, a mobile user may walk from place to place while making a phone call, answer email from a bus, or stream a podcast while driving, and so on. These may be situations in which the user may be intolerant of gaps in network coverage. The mobile user is also unlikely to consume a lot of data under these circumstances. WI-FI and CBRS networks, on the other hand, may be particularly suitable for nomadic usage where it can be more important to have a stable connection (e.g., relatively more tolerant of coverage gaps) and to be able to consume large amounts of data at little to no cost. For example, a nomadic user can decamp from place to place but may sit down for extended periods of time to do data-intensive work, such as receiving large files, editing them, and sending them back online. The same users, on the same devices, can be mobile users or nomadic users at different periods of times, and network operators are beginning to incorporate WI-FI, cellular, and CBRS network infrastructure into their own networks for increased flexibility, availability, and capacity, among other benefits. However, it can be challenging to manage these separate access technologies as integrated systems with unified policy, security, and analytics in view of the differences among them in terms of cost, infrastructure layout, the level of administrative control they can provide, and the like. Users and devices need to move between these different wireless systems, and network operators want the experience to be seamless and easy to manage at scale.

Turning now to the drawings, FIG. 1A illustrates an example of an enterprise network 100. It should be understood that, for the enterprise network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 100 can include any number or type of resources, which can be accessed and utilized by endpoints or network devices. The illustrations and examples provided herein are for clarity and simplicity.

In this example, the enterprise network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more AAA appliances 106, wireless network infrastructure equipment 108 (e.g., WLCs, EPC equipment, 4G/LTE or 5G Core network equipment, etc.), and one or more fabric control plane nodes 110. In other embodiments, one or more elements of the management cloud 102 may be co-located with the network fabric 120.

The network controller appliances 104 can function as the command and control system for one or more network fabrics, and can house automated workflows for deploying and managing the network fabrics. The network controller appliances 104 can include automation, design, policy, provisioning, and assurance capabilities, among others, as discussed further below with respect to FIG. 2. In some embodiments, one or more Cisco Digital Network Architecture (Cisco DNA™) appliances can operate as the network controller appliances 104.

The AAA appliances 106 can control access to computing resources, facilitate enforcement of network policies, audit usage, and provide information necessary to bill for services. The AAA appliance can interact with the network controller appliances 104 and with databases and directories containing information for users, devices, things, policies, billing, and similar information to provide authentication, authorization, and accounting services. In some embodiments, the AAA appliances 106 can utilize Remote Authentication Dial-In User Service (RADIUS) or Diameter to communicate with devices and applications. In some embodiments, one or more Cisco® Identity Services Engine (ISE) appliances can operate as the AAA appliances 106.

The wireless network infrastructure equipment 108 can support fabric-enabled base stations and access points attached to the network fabric 120, handling traditional tasks associated with a WLC or 4G/LTE or 5G Core network equipment as well as interactions with the fabric control plane for wireless endpoint registration and roaming. In some embodiments, the network fabric 120 can implement a wireless deployment that moves data-plane termination (e.g., Virtual Extensible Local Area Network (VXLAN)) from a centralized location (e.g., with previous overlay Control and Provisioning of Wireless Access Points (CAPWAP) deployments) to a wireless base station or access point/fabric edge node. This can enable distributed forwarding and distributed policy application for wireless traffic while retaining the benefits of centralized provisioning and administration. In some embodiments, one or more Cisco® Catalyst® controllers, Cisco® Wireless Controllers, Cisco® Wireless Local Area Network (LAN), and/or other Cisco DNA™-ready wireless controllers can operate as the wireless network infrastructure equipment 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane nodes 110 are shown to be external to the network fabric 120 in this example, in other embodiments, the fabric control plane nodes 110 may be co-located with the network fabric 120. In embodiments where the fabric control plane nodes 110 are co-located with the network fabric 120, the fabric control plane nodes 110 may comprise a dedicated node or set of nodes or the functionality of the fabric control nodes 110 may be implemented by the fabric border nodes 122.

The fabric control plane nodes 110 can serve as a central database for tracking all users, devices, and things as they attach to the network fabric 120, and as they roam around. The fabric control plane nodes 110 can allow network infrastructure (e.g., switches, routers, WLCs, etc.) to query the database to determine the locations of users, devices, and things attached to the fabric instead of using a flood and learn mechanism. In this manner, the fabric control plane nodes 110 can operate as a single source of truth about where every endpoint attached to the network fabric 120 is located at any point in time. In addition to tracking specific endpoints (e.g., /32 address for IPv4, /128 address for IPv6, etc.), the fabric control plane nodes 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In some embodiments, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-Ready™ devices can operate as the fabric nodes 122, 124, and 126.

The enterprise network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless base stations and access points 128B and 128E (collectively, 128), respectively, which in turn can connect by wire to fabric edge nodes 126B and 126E, respectively. In some embodiments, Cisco® Catalyst® access points, Cisco Aironet® access points, Cisco Meraki® MR access points, and/or other Cisco DNA™-ready access points can operate as the wireless base stations and access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles;

smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the wireless network infrastructure equipment 108 notifying the fabric control plane nodes 110 of joins, roams, and disconnects by the wireless endpoints 130 such that the fabric control plane nodes can have connectivity information about both wired and wireless endpoints in the network fabric 120, and can serve as the single source of truth for endpoints connected to the network fabric. For data plane integration, the wireless network infrastructure equipment 108 can instruct the fabric wireless base stations and access points 128 to form a VXLAN overlay tunnel to their adjacent fabric edge nodes 126. The VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless base stations and access points 128, the wireless network infrastructure equipment 108 can onboard the endpoints into the network fabric 120 and inform the fabric control plane nodes 110 of the endpoints' Media Access Control (MAC) addresses (or other identifiers). The wireless network infrastructure equipment 108 can then instruct the fabric wireless base stations and access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane nodes 110 to form a mapping between the endpoints' MAC and IP addresses, and traffic to and from the wireless endpoints 130 can begin to flow.

Figure 1B:
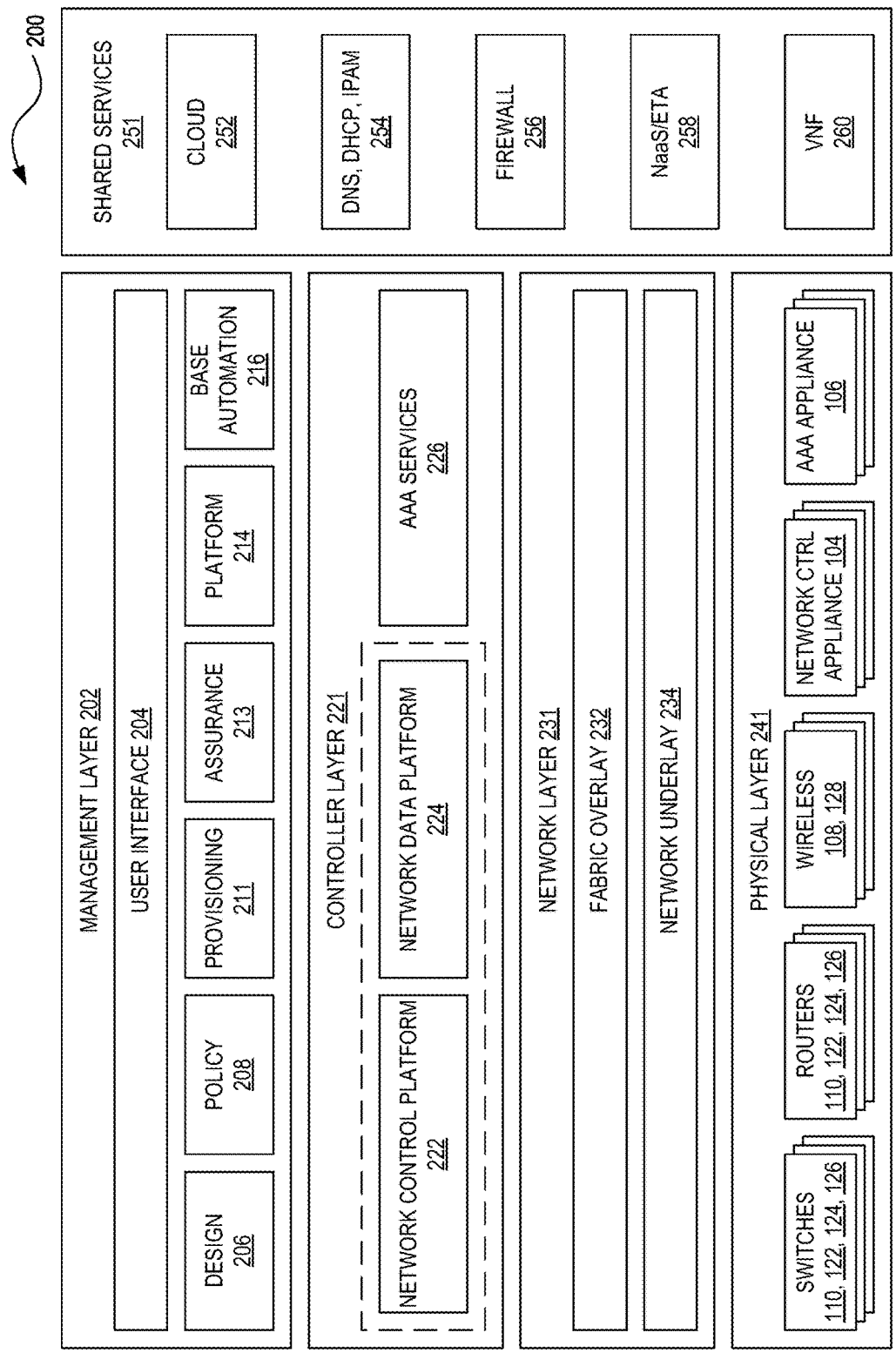
FIG. 1B illustrates an example of a logical architecture for an enterprise network, such as the enterprise network of FIG. 1A, in accordance with an embodiment of the present disclosure.

FIG. 1B illustrates an example of a software architecture or logical architecture 200 for an enterprise network. One of ordinary skill in the art will understand that, for the logical architecture 200 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 200 includes a management layer 202, a controller layer 221, a network layer 231, the physical layer 241, and a shared services layer 251.

The management layer 202 can abstract the complexities and dependencies of other layers and provide a user with tools and workflows to manage an enterprise network (e.g., the enterprise network 100). The management layer 202 can include a user interface 204, design functions 206, policy functions 208, provisioning functions 211, assurance functions 213, platform functions 214, and base automation functions. The user interface 204 can provide a user a single point to manage and automate the network. The user interface 204 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 204 may also provide visibility information, such as views of a network, network infrastructure, computing devices, and things. For example, the user interface 204 can provide a view of the status or conditions of the network, the operations taking place, services, performance, a topology or layout, protocols implemented, running processes, errors, notifications, alerts, network structure, ongoing communications, data analysis, and so forth.

The design functions 206 can include tools and workflows for managing site profiles, maps and floor plans, network settings, and IP address management, among others. The policy functions 208 can include tools and workflows for defining and managing network policies. The provisioning functions 211 can include tools and workflows for deploying the network. The assurance functions 213 can use machine learning and analytics to provide end-to-end visibility of the network by learning from the network infrastructure, endpoints, and other contextual sources of information. The platform functions 214 can include tools and workflows for integrating the network management system with other technologies. The base automation functions can include tools and workflows to support the policy functions 208, the provisioning functions 211, the assurance functions 213, and the platform functions 214.

In some embodiments, the design functions 206, the policy functions 208, the provisioning functions 211, the assurance functions 213, the platform functions 214, and the base automation functions can be implemented as microservices in which respective software functions are implemented in multiple containers communicating with each rather than amalgamating all tools and workflows into a single software binary. Each of the design functions 206, policy functions 208, provisioning functions 211, assurance functions 213, and platform functions 214 can be viewed as a set of related automation microservices to cover the design, policy authoring, provisioning, assurance, and cross-platform integration phases of the network lifecycle. The base automation functions can support the top-level functions by allowing users to perform certain network-wide tasks.

The controller layer 221 can comprise subsystems for the management layer 202 and may include a network control platform 222, a network data platform 224, and AAA services 226. These controller subsystems can form an abstraction layer to hide the complexities and dependencies of managing many network devices and protocols.

The network control platform 222 can provide automation and orchestration services for the network layer 231 and the physical layer 241, and can include the settings, protocols, and tables to automate management of the network and physical layers. For example, the network control platform 222 can provide the design functions 206, the policy functions 208, the provisioning functions 211, and the platform functions 214. In addition, the network control platform 222 can include tools and workflows for discovering switches, routers, wireless controllers, and other network devices (e.g., the network discovery tool); maintaining network and endpoint details, configurations, and software versions (e.g., the inventory management tool); Plug-and-Play (PnP) for automating deployment of network infrastructure (e.g., the network PnP tool), Path Trace for creating visual data paths to accelerate the troubleshooting of connectivity problems, Easy QoS for automating quality of service to prioritize applications across the network, and Enterprise Service Automation (ESA) for automating deployment of physical and virtual network services, among others. The network control platform 222 can communicate with network devices using Network Configuration (NETCONF)/Yet Another Next Generation (YANG), Simple Network Management Protocol (SNMP), Secure Shell (SSH)/Telnet, and so forth. In some embodiments, the Cisco® Network Control Platform (NCP) can operate as the network control platform 222.

The network data platform 224 can provide for network data collection, analytics, and assurance, and may include the settings, protocols, and tables to monitor and analyze network infrastructure and endpoints connected to the network. The network data platform 224 can collect multiple types of information from network devices, including System Logging Protocol ("syslog"), SNMP, NetFlow, Switched Port Analyzer (SPAN), and streaming telemetry, among others. The network data platform 224 can also collect use contextual information shared from the network devices. Syslog is a protocol that can be used to send system log or event messages to a server (e.g., a syslog server). The syslog can collect logs from various devices to monitor and review data.

In some embodiments, one or more Cisco DNA™ Center appliances can provide the functionalities of the management layer 202, the network control platform 222, and the network data platform 224. The Cisco DNA™ Center appliances can support horizontal scalability by adding additional Cisco DNA™ Center nodes to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third party vendors. The Cisco DNA™ Center appliances can also be cloud-tethered to provide for the upgrade of existing functions and additions of new packages and applications without having to manually download and install them.

The AAA services 226 can provide identity and policy services for the network layer 231 and physical layer 241, and may include the settings, protocols, and tables to support endpoint identification and policy enforcement services. The AAA services 226 can provide tools and workflows to manage virtual networks and security groups, and to create group-based policies and contracts. The AAA services 226 can identify and profile network devices and endpoints using AAA/RADIUS, 802.1X, MAC Authentication Bypass (MAB), web authentication, and EasyConnect, among others. The AAA services 226 can also collect and use contextual information from the network control platform 222, the network data platform 224, and the shared services layer 251, among others. In some embodiments, Cisco® ISE can provide the AAA services 226.

The network layer 231 can be conceptualized as a composition of two layers, an underlay 234 comprising physical and virtual network infrastructure (e.g., routers, switches, WLCs, etc.) and a Layer 3 routing protocol for forwarding traffic, and an overlay 232 comprising a virtual topology for logically connecting wired and wireless users, devices, and things and applying services and policies to these entities. Network devices of the underlay 234 can establish connectivity between each other, such as via IP. The underlay may use any topology and routing protocol.

In some embodiments, the network controller appliances 104 can provide a local area network (LAN) automation service, such as implemented by Cisco DNA™ Center LAN Automation, to automatically discover, provision, and deploy network devices. Once discovered, the automated underlay provisioning service can leverage Plug and Play (PnP) to apply the required protocol and network address configurations to the physical network infrastructure. In some embodiments, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPv4, IPv6, and non-IP traffic.

The overlay 232 can be a logical, virtualized topology built on top of the physical underlay 234, and can include a fabric data plane, a fabric control plane, and a fabric policy plane. In some embodiments, the fabric data plane can be created via packet encapsulation using Virtual Extensible LAN (VXLAN) with Group Policy Option (GPO). Some of the advantages of VXLAN-GPO include its support for both Layer 2 and Layer 3 virtual topologies (overlays), and its ability to operate over any IP network with built-in network segmentation.

In some embodiments, the fabric control plane can implement Locator/Identifier Separation Protocol (LISP) for logically mapping and resolving users, devices, and things. LISP can simplify routing by removing the need for each router to process every possible IP destination address and route. LISP can achieve this by moving remote destination to a centralized map database that allows each router to manage only its local routs and query the map system to locate destination endpoints.

The fabric policy plane is where intent can be translated into network policy. That is, the policy plane is where the network operator can instantiate logical network policy based on services offered by the network fabric 120, such as security segmentation services, QoS, capture/copy services, application visibility services, and so forth.

Segmentation is a method or technology used to separate specific groups of users or devices from other groups for the purpose of reducing congestion, improving security, containing network problems, controlling access, and so forth. As discussed, the fabric data plane can implement VXLAN encapsulation to provide network segmentation by using the virtual network identifier (VNID) and Scalable Group Tag (SGT) fields in packet headers. The network fabric 120 can support both macro-segmentation and micro-segmentation. Macro-segmentation logically separates a network topology into smaller virtual networks by using a unique network identifier and separate forwarding tables. This can be instantiated as a Virtual Routing and Forwarding (VRF) instance and referred to as a Virtual Network (VN). That is, a VN is a logical network instance within the network fabric 120 defined by a Layer 3 routing domain and can provide both Layer 2 and Layer 3 services (using the VNID to provide both Layer 2 and Layer 3 segmentation). Micro-segmentation logically separates user or device groups within a VN, by enforcing source to destination access control permissions, such as by using access control lists (ACLs). A scalable group is a logical object identifier assigned to a group of users, devices, or things in the network fabric 120. It can be used as source and destination classifiers in Security Group ACLs (SGACLs). The SGT can be used to provide address-agnostic group-based policies.

In some embodiments, the fabric control plane node 110 may implement the Locator/Identifier Separation Protocol (LISP) to communicate with one another and with the management cloud 102. Thus, the control plane nodes may operate a host tracking database, a map server, and a map resolver. The host tracking database can track the endpoints 130 connected to the network fabric 120 and associate the endpoints to the fabric edge nodes 126, thereby decoupling an endpoint's identifier (e.g., IP or MAC address) from its location (e.g., closest router) in the network.

The physical layer 241 can comprise various network devices, such as the switches and routers 110, 122, 124, and 126, the wireless network infrastructure equipment 108, the wireless base stations and access points 128, the network controller appliances 104, and the AAA appliances 106, among others.

The shared services layer 251 can provide an interface to external network services, such as cloud services 252; Domain Name System (DNS), DHCP, IP Address Management (IPAM), and other network address management services 254; firewall services 256; Network as a Sensor (NaaS)/Encrypted Threat Analytics (ETA) services 258; and Virtual Network Functions (VNFs) 260; among others. The management layer 202 and/or the controller layer 221 can share identity, policy, forwarding information, and so forth via the shared services layer 251 using APIs.

Figure 2:
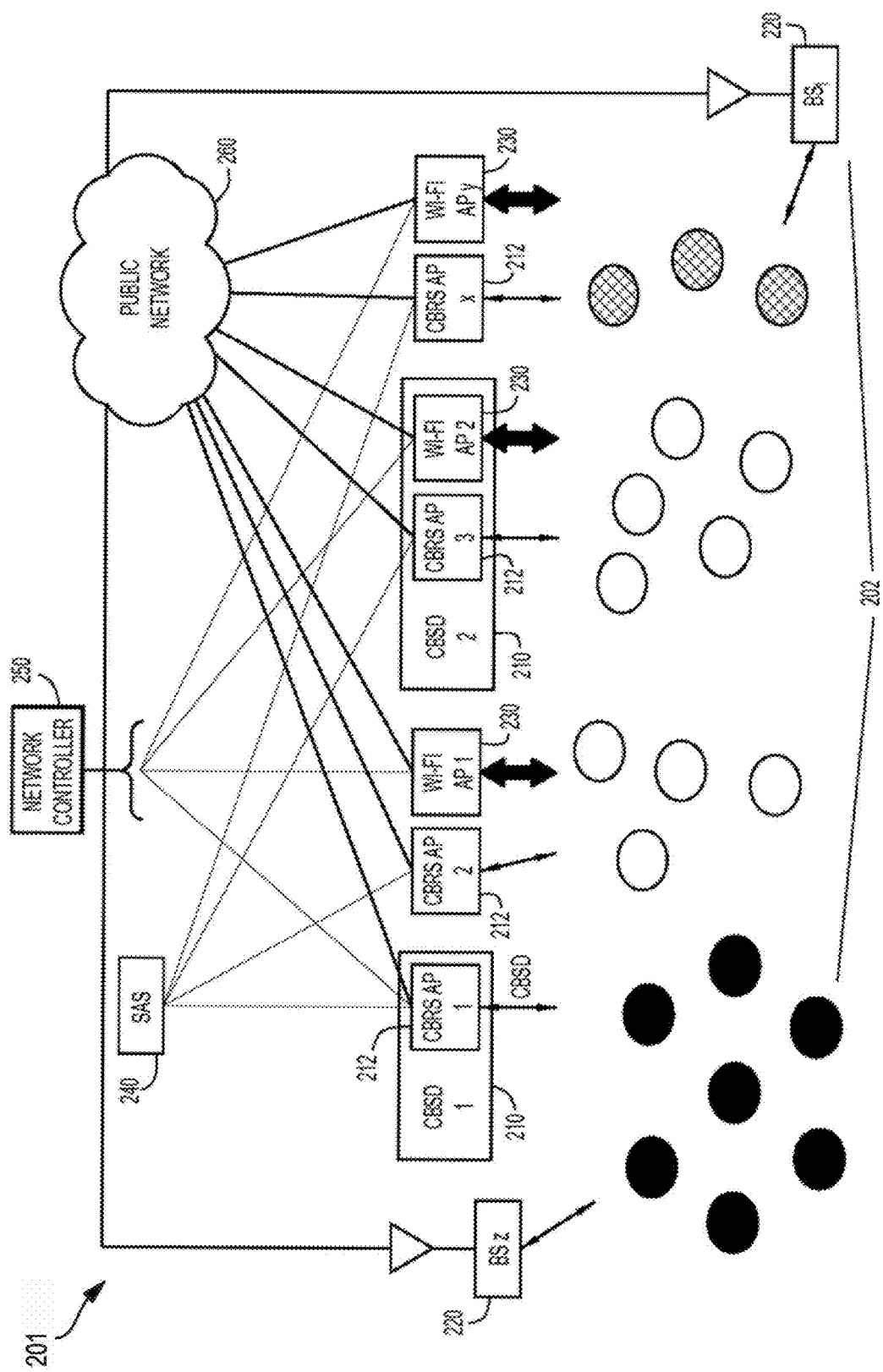
FIG. 2 illustrates an example of a heterogeneous wireless network, in accordance with an embodiment of the present disclosure.

FIG. 2 illustrates of an example of a heterogeneous wireless network 201, such as a network capable of providing User Equipment (UE) devices network access via a Wi-Fi network, cellular network, CBRS, and/or other radio network. In this example, the heterogeneous wireless network 201 includes User Equipment (UE) devices 203 (shown as circles), CBRS Devices (CBSDs) 210 (e.g., CBSD1 and CBSD2), CBRS APs 212 (e.g., CBRS AP 1, 2, . . . , x), base stations 220 (e.g., BS1, . . . , Bz) of a public radio network, Wi-Fi access points 230 (e.g., Wi-Fi AP1, 2, . . . , y), a Spectrum Access System (SAS) 240, a network controller 250, and a public IP network 260. Some of the CBSDs 210 may include CBRS APs 212. The CBSDs 210, BSs 220, and Wi-Fi APs 230 can connect the UE devices 203 to the public IP network 260. The public IP network 260 may include a public data network, such as the Internet.

In FIG. 2, at least some of the UE devices 203 may be CBRS-enabled such that they can connect to the public IP network 260 via a CBRS network. For example, the UE devices 203 can attach to a CBRS network comprising the CBRS APs 212. Some of the CBRS APs 212 may be standalone devices, such as the CBRS AP 2 and CBRS AP x, while others can be integrated with other components and are part of another device such as is the case for the CBRS AP 1 and CBRS AP 3 in which the CBRS AP 1 is part of the CBSD 1 and CBRS AP 3 is part of the CBSD 2.

The CBSD 1 may also include a controller (not shown). A CBSD that includes a controller can be an evolved NodeB (eNodeB), defined in a Universal Mobile Telecommunications System (UMTS) standard. The CBSD 2 may be an integrated AP device that includes the CBRS AP 3 and also the Wi-Fi AP 2.

The SAS 240 can operate as a controller for the CBSDs 210 and the CBRS APs 212. The SAS 240 can manage the CBRS spectrum and maintain a database of spectrum usage by all users, including Tier 1 users, Tier 2 users, and Tier 3 users (as shown in Table 1), in all census tracts or areas. The SAS 240 can allocate channels to the CBRS APs 212 using a variety of rules. For example, the SAS 240 can consider multiple factors and inform the CBRS APs 212 and the CBSDs 210 of the operating parameters including allocated frequency band, allocated channel, and/or maximum effective isotropic radiated power that can be used at a given point in time. The SAS 240 can also provide the FCC required 300 second notification that an enterprise (e.g., a Tier 3 or GAA user) needs to offload its UE devices 203 from the CBRS network.

When the enterprise is forced to offload its UE devices 203, the UE devices 203 may be offloaded to a cellular network provided via the BSs 220 or to a Wi-Fi network provided via the Wi-Fi APs 230. In FIG. 2, based on the 300 second notification provided by the SAS 240 to the CBSD 1, a set of UE devices 203 attached to the CBRS AP 1 (shaded circles) may be offloaded from the CBRS AP 1 to the BSz, as an example. The set of the UE devices 203 can continue to obtain access to the public IP network 260 via the BSz and are offloaded from the CBRS network. According to another example embodiment, another set of the UE devices 203 (e.g., cross hatched circles) may be offloaded to a Wi-Fi network provided via the Wi-Fi AP y.

The Wi-Fi APs 230 can be managed and controlled by the network controller 250. The network controller 250 may include a WLC. In one example embodiment, the network controller 250 may also include an interworking function (IWK) to manage the CBRS APs 212 or operate as a controller for at least some of the CBRS APs 212. The network controller 250 may generate policies and push the policies to various access points for execution. For example, the network controller 250 may run analytics to develop CBRS offloading policies. It is also possible, however, some or all of the functions of the network controller 250 may be implemented within one or more of the CBSDs 210 or the CBRS APs 212.

The enterprise network landscape is continuously evolving. There is a greater demand for mobile and Internet of Things (IoT) device traffic, Software as a Service (SaaS) applications, and cloud adoption. In addition, security needs are increasing and certain applications can require prioritization and optimization for proper operation. As this complexity grows, there is a push to reduce costs and operating expenses while providing for high availability and scale.

Conventional WAN architectures are facing major challenges under this evolving landscape. Conventional WAN architectures typically consist of multiple Multi-Protocol Label Switching (MPLS) transports, or MPLS paired with Internet or Long-Term Evolution (LTE) links used in an active/backup fashion, most often with Internet or SaaS traffic being backhauled to a central data center or regional hub for Internet access. Issues with these architectures can include insufficient bandwidth, high bandwidth costs, application downtime, poor SaaS performance, complex operations, complex workflows for cloud connectivity, long deployment times and policy changes, limited application visibility, and difficulty in securing the network.

In recent years, a typical firewall has many access control rules. Some of these firewalls are statically defined by the user, while some are dynamically added based on a decision of a security policy. Having these rules in the firewall includes disadvantages such as forcing a dependence on topology as all of the network traffic needs to be forced through the firewall. The network traffic has to be completely sent to the firewall before it is dropped. This is especially inefficient in cases where the security function is in a cloud because there are also Wide Area Network (WAN) bandwidth implications.

As such, a need exists to leverage a network to implement stateless aspects of a security policy without loss in capability, scale, and/or logging.

Figure 3:
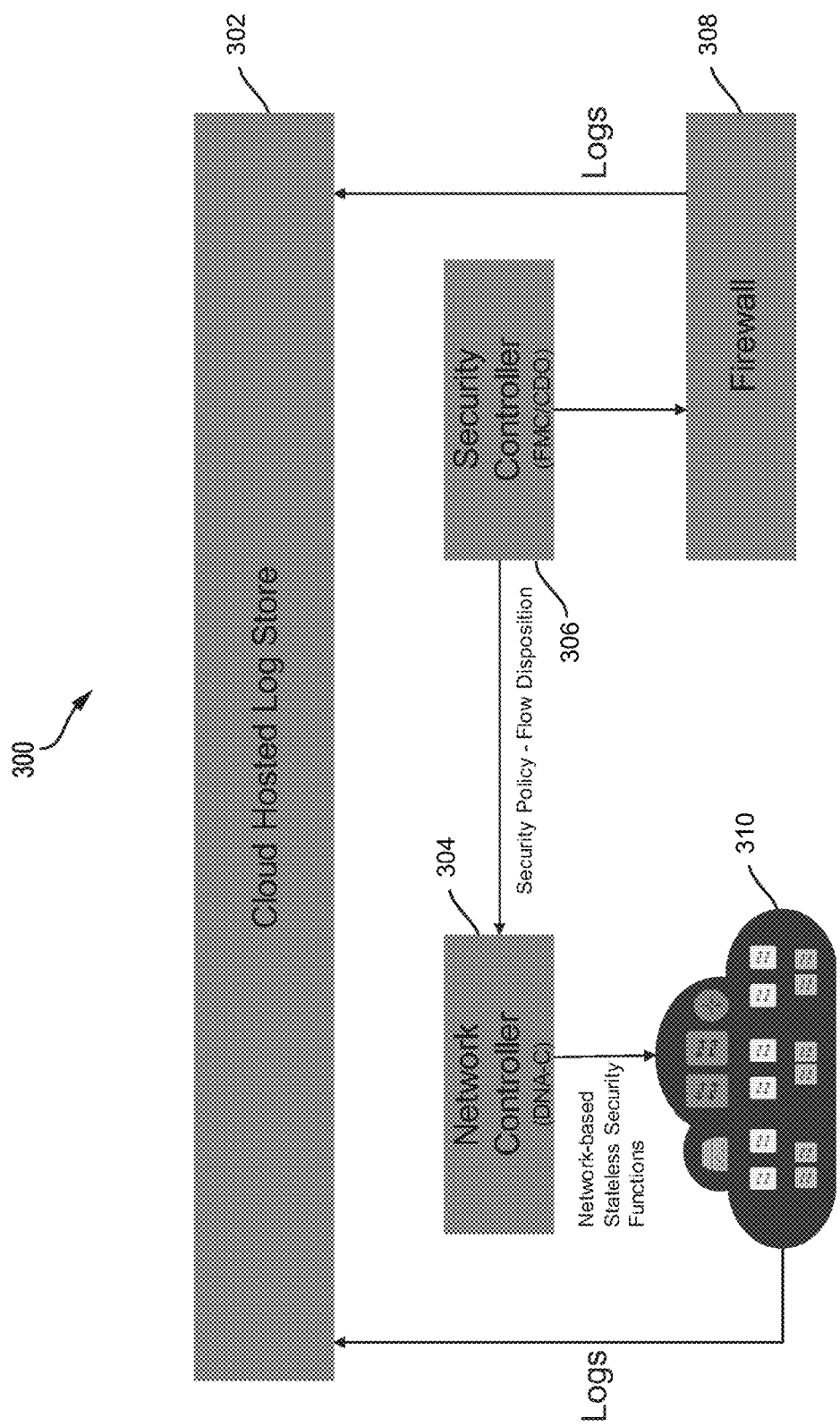
FIG. 3 illustrates an example of a topology for an enterprise network, in accordance with some embodiments.

FIG. 3 illustrates an example of a topology for an enterprise network 300, in accordance with some embodiments. The enterprise network 300 can include a cloud hosted log store 302, a network controller 304, a security controller 306, a firewall 308, and network devices 310. In some instances, the network controller 304 can be a Cisco Digital Network Architecture (DNA) Center. In other instances, the security controller 306 can be a Cisco Defense Orchestrator (CDO) or a Firepower Management Center (FMC).

The DNA Center 304 that can provide the functionalities of a management layer, a network control platform, and a network data platform. The DNA Center 304 can also support horizontal scalability by adding additional DNA Center nodes to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third party vendors. The DNA Center 304 can also be cloud-tethered to provide for the upgrade of existing functions and additions of new packages and applications without having to manually download and install them.

The DNA Center 304 can further be a network management system, controller, and analytics platform for an intent-based network. Beyond device management and configuration, the DNA Center 306 can provide the ability to control access through policies using Software-Defined Access (SD-Access), automatically provision through Cisco DNA Automation, virtualize devices through Cisco® Network Functions Virtualization (NFV), and lower security risks through segmentation and Encrypted Traffic Analysis (ETA).

Furthermore, the DNA Center 304 can include DNA Assurance that can collect streaming telemetry from devices around the network and use artificial intelligence (AI) and machine learning to help ensure alignment of network operations with business intent. In doing so, the DNA Assurance can optimize network performance, enforce network policies, and reduce time spent on troubleshooting tasks. The DNA Center 304 can provide 360-degree extensibility with a broad ecosystem of partners and independent software vendors (ISV) that allow the network be more agile and fully in tune with business priorities.

In some instances, the CDO 306 of the enterprise network 300 can be a cloud-based multi-device manager that facilitates management of security policies in highly distributed environments to achieve consistent policy implementation. The CDO 306 can assist in the optimization of security policies by identifying inconsistencies with them and by providing tools to fix them. The CDO 306 also can provide ways to share objects and policies, as well as make configuration templates, to promote policy consistency across devices. Because the CDO 306 can coexist with local device managers such as an Adaptive Security Device Manager (ASDM), Firepower Device Manager (FDM), and SSH connections, the CDO 306 can keep track of configuration changes made by the CDO 306 and by other managers. The CDO 306 also can include an intuitive user interface that allows management of a wide range of devices in one place.

The CDO 306 can communicate with managed devices using a proxy called Secure Device Connector (SDC). Each tenant may include its own dedicated SDC. The SDC can monitor the CDO 306 for commands and messages that may be executed on managed devices. The SDC can further monitor the managed devices for messages that may be provided to the CDO 306. The SDC can execute the commands on behalf of the CDO 306 and provide messages to the CDO 306 on behalf of the managed devices. When devices are onboarded to the CDO 306, the device's login credentials can be encrypted and stored on the SDC. In other instances, the SDC may access the device credentials and not the CDO 306.

In other instances, the DNA Center 304 can further exchange object membership with the CDO 306. The CDO 306 can then provide the policies to the firewalls 308 to program security policies. The policies that can be enabled by the CDO 306 include segmentation policies, L7 firewall policies, Intrusion Prevention System (IPS) policies, file inspection policies, Uniform Resource Locator (URL) filtering policies, Secure Sockets Layer (SSL) decryption policies, or any other policy suitable for the intended purpose and understood by a person of ordinary skill in the art.

In some instances, the enterprise network 300 can include distributing stateless aspects of security policies that can include the following benefits: 1) offloading the firewall 308; 2) dropping network traffic that is closest to a source 310, thereby saving bandwidth and firewall computing resources; and 3) increased scale. Leveraging of the enterprise network 300 can also be performed without losing any capabilities in comparison to a centralized deployment on a firewall, specifically with respect to logging.

In other instances, the network controller 304 can establish a communication channel with the security controller 306 for an exchange of information (e.g., security policies—flow disposition). The enterprise network 300 can include the network controller 304 (e.g., DNA-C/vManage) and receive rules from the security controller 306. The network controller 304 can then push stateless L2/L3/L4 Access Control List (ACL) policies to the network devices 310. The network devices 310 can include access switches, wireless LAN controllers, branch edge routers, or any other network device suitable for the intended purpose and understood by a person of ordinary skill in the art.

By providing the stateless policies to the network devices 310, the network traffic can be dropped closest to the source of the network traffic. In some instances, the network controller 304 can view the entire switching hierarchy as a resource pool for implementation of ACLs. The network controller 304 can further provide the rules/policies to the corresponding network devices 310 (e.g., switches) in the hierarchy based on resource availability (e.g., Ternary Content Addressable Memory (TCAM)).

Figure 4:
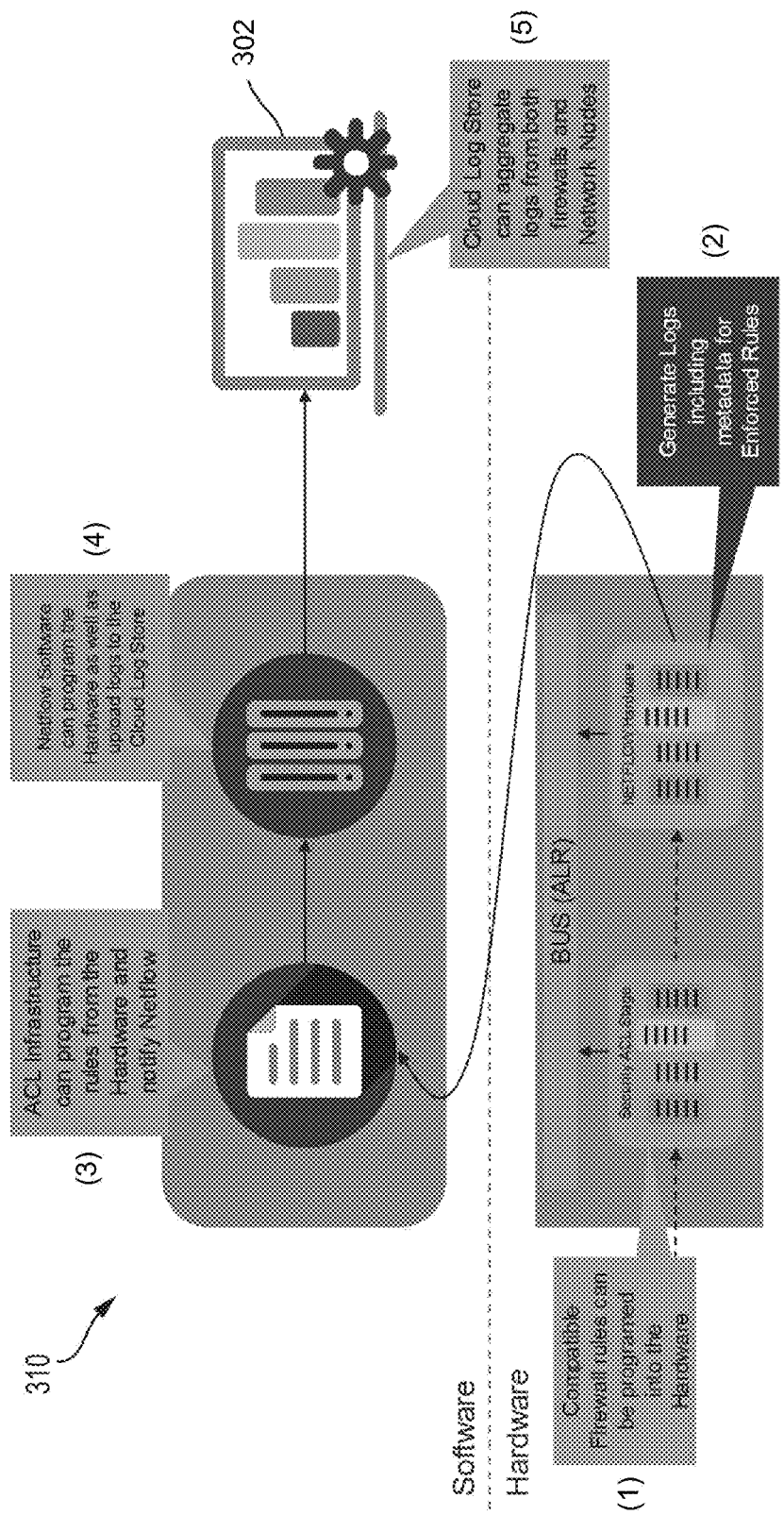
FIG. 4 illustrates an example of a topology for a network device and a cloud log store, in accordance with some embodiments.

FIG. 4 illustrates an example of a topology for a network device 310 and a cloud log store 302, in accordance with some embodiments.

In some instances, the disposition of the flow by the firewall 308 can be implemented in the enterprise network 300. If a flow is decided as either malicious or safe and a disposition is complete, the decision can be pushed by the network controller 304 to the network devices 310 (e.g., switches/routers/wireless LAN controllers) for implementation by the network devices 310. There may be a timeout associated with this, which can result in the rule being removed from the data path cache periodically.

Once these rules/functions have been implemented by the network devices 310 (e.g., network nodes), a NetFlow table can be leveraged to implement a particular level of logging support. The enterprise network 300 can include a NetFlow-based mechanism for tracking Access Control Lists (ACL) that enforce permits and drops, which includes a number of advantages over the ACL logging-based option. The NetFlow-based mechanism can be a feature of a router that provides the ability to collect network data traffic as it enters or exits an interface. By analyzing the network data provided by the NetFlow-based mechanism, a network administrator can determine network information such as the source and destination of network traffic, class of service, and the causes of congestion.

In some instances, the NetFlow-based mechanism of the enterprise network 300 can track flows that may be dropped at line rate. The NetFlow-based logging mechanism can also provide rich details such as flow size and flow duration along with Packet Information such as Src/Dst IP and Ports, which are missing in other options. The NetFlow-based mechanism can efficiently provide services for IP applications, including network traffic accounting, usage-based network billing, network planning, security, Denial of Service monitoring capabilities, and network monitoring. The NetFlow-based mechanism can provide valuable information about network users and applications, peak usage times, and traffic routing. The NetFlow-based mechanism can be a flexible and extensible method to record network performance data.

In other instances, the NetFlow-based mechanism can track packets on a per flow level and not on a per packet basis. For example, one log can be generated on a per flow basis regardless of how many packets are seen for that particular flow. Utilizing the NetFlow-based mechanism can include the above-mentioned benefits that are advantageous over an ACL logging mechanism, which is stateless and that generates a log for every packet.

Switches are capable of dropping traffic (e.g., "block" packets) directly in the hardware without assistance from software. However, when a dropped data packet is to be logged, the entire data packet can be inspected/gleaned (e.g., with the software) to obtain particulars regarding the dropped data packet. For example, the particulars of the dropped data packet can include metadata such as volume, rate, source, destination, and protocol information. The data packet can further be inspected so that an appropriate user-friendly log can be generated, and if required, may be uploaded to a cloud log store.

This may be an unreliable and a resource intensive process because the hardware can drop large amounts of data packets while the software on the main CPU inspects and logs the data packets. Using this type of mechanism to drop high rate traffic can cause not only unreliable logging (e.g., in terms of missed flows or incorrect data about the flow (e.g., volume and rate)), it can also cause the CPU to run at a high utilization rate, thereby affecting the stability of the entire system.

The flow-based, hardware assisted mechanism described herein can manage the "inspection/gleaning of metadata" portion by hardware without the assistance of software intervention. The gleaned data alone can be sent to the software for printing the log and exporting the log to external log stores. By utilizing the flow-based, hardware assigned mechanism, traffic is not merely dropped, but rather, the metadata of the dropped traffic can be tracked entirely by the hardware while using the software to display the log/export.

Hardware generated records can also be correlated to Access Control Entity (ACE)/ACL that can cause a drop in Software. The hardware can also provide a Rule ID that was caused by the drop. While the Rule ID can be an internal hardware specific ID, the Rule ID can be reverse-mapped to a corresponding ACL Rule in the software that also maps to the ID in the Hardware. IP packets can be dropped within existing match criteria constraints. Contrary to an ACL log approach, the ACL log approach is subject to scale limitations, which cannot be quantified because it is directly a function of the type of network traffic.

The table below illustrates examples of the information that is typically required for a log generation and the information that the NetFlow-based approach can generate:

| What is typically needed | What NetFlow-based ACL Drop Logging provides from Hardware | What NetFlow-based logging can provide through Software Enhancements | What additional data is provided |
| --- | --- | --- | --- |
| SGT<br>DGT<br>Source IP<br>Destination IP<br>ACL Name | SGT<br>DGT<br>Source IP<br>Destination IP<br>Source Interface Marker to indicate a dropped Flow | ACE Entry<br>ACL Name | Flow Telemetry<br>Volume<br>Duration<br>Start/End Time |

As illustrated in the above table, the NetFlow-based mechanism can generate logs including SGT, DGT, source IP, destination IP, source interface, and a marker to indicate a dropped flow. The NetFlow-based generated logs can further be supplemented to include information relating to ACE entry and ACL name. In other instances, the NetFlow-based generated logs can include flow telemetry, volume, duration, and start/end times.

As shown in FIG. 4, at step (1), compatible firewall rules can be programmed into the hardware of the network device 310 at a security ACL stage. At step (2), the NetFlow hardware can also generate logs including metadata for enforced rules. Examples of metadata are included in the above-referenced table. Details that can be obtained directly from the data packet include: Source IP, Destination IP, and Port and Protocol details. Data that can be obtained/received internally from a network node relating to the data packet can include: SGT, DGT, ACE Entry, ACL Name, flow telemetry, volume, duration, and start/end times.

Enforced rules can include a rule that has been enforced on a data packet because the data packet matched all of its enforcement criteria. There can be thousands of rules at any given Node. However, if only a single rule matches the data packet, no data may be generated for unenforced/unmatched rules. Enforced rules can also be referred to as "matched rules."

In some instances, the security ACL stage and the NetFlow hardware may be communicatively coupled to the BUS. In other instances, at step (3), the ACL infrastructure of the network device 310 can program the rules from the hardware and notify a NetFlow-based mechanism. At step (4), the NetFlow-based mechanism (e.g., software) can program the hardware accordingly and provide (e.g., upload) the generated logs to the cloud log store 302. In some instances, at step (5), the cloud log store 302 can aggregate logs from the firewall 308 and the network devices 310 (e.g., network nodes) as shown in FIG. 3.

Figure 5:
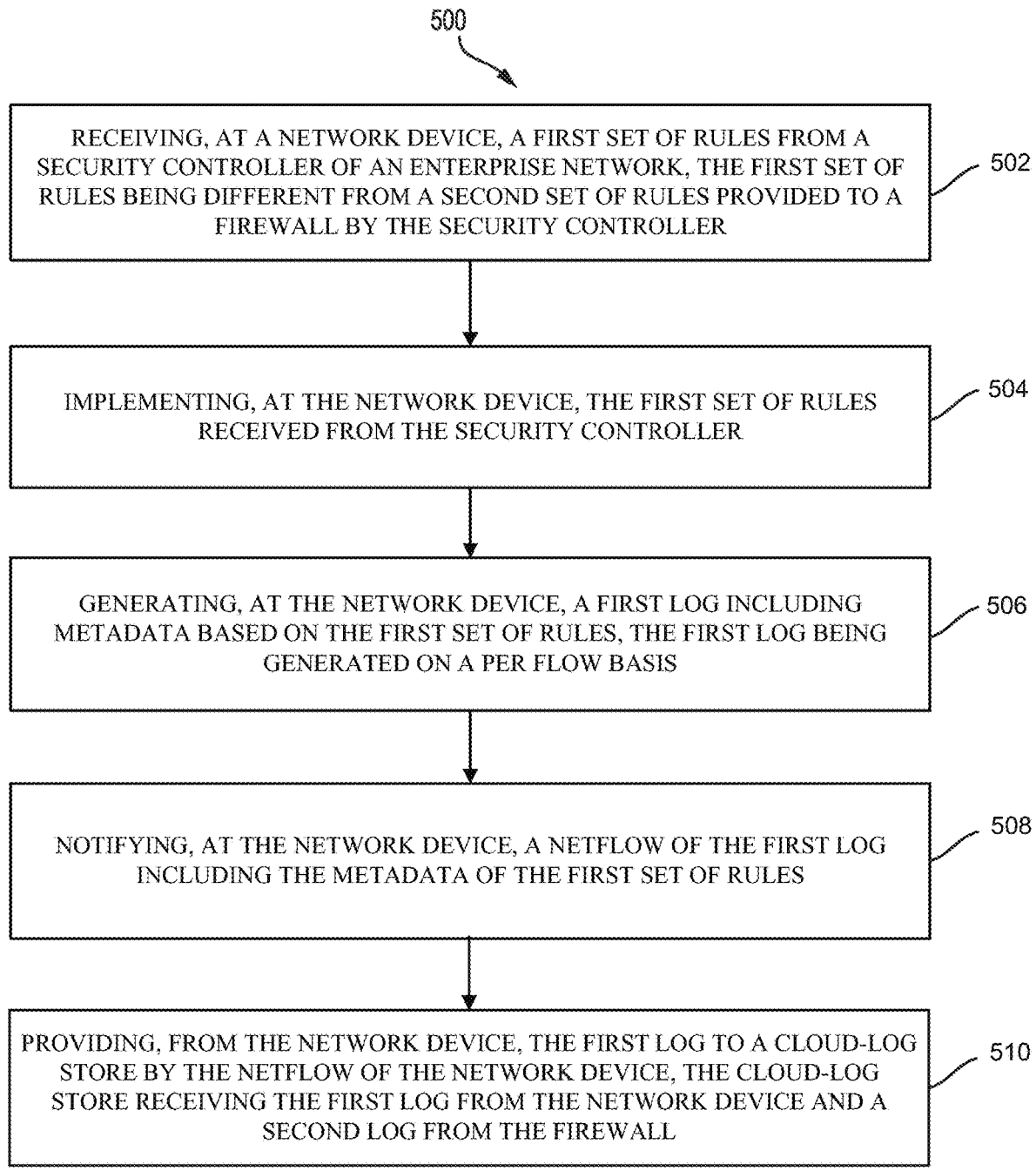
FIG. 5 illustrates an example process for implementing a security policy, in accordance with some embodiments.

Having disclosed some example system components and concepts, the disclosure now turns to FIG. 5, which illustrate example method 500 for implementing a security policy. The steps outlined herein are exemplary and can be implemented in any combination thereof, including combinations that exclude, add, or modify certain steps.

At step 502, the method 500 can include receiving, at a network device, a first set of rules from a security controller of an enterprise network, the first set of rules being different from a second set of rules provided to a firewall by the security controller.

In some instances, the first set of rules can be routed from security controller and through a network controller to the network device.

In other instances, the first set of rules of the network device and the second set of rules of the firewall can divide network traffic to offload the firewall, drop network traffic to a closest source, or increase scale.

At step 504, the method 500 can include implementing, at the network device, the first set of rules received from the security controller.

In some instances, the implementing of the first set of rules can occur at a security access control list stage of the network device. In other instances, the security access control list stage can notify the NetFlow of the first log.

At step 506, the method 500 can include generating, at the network device, a first log including metadata based on the first set of rules, the first log being generated on a per flow basis.

At step 508, the method 500 can include notifying, at the network device, a NetFlow of the first log including the metadata of the first set of rules. In other instances, the method 500 can include notifying, at the network device, a syslog of the first log including the metadata of the first set of rules. The syslog can also be any other mechanism suitable for the intended purpose and understood by a person of ordinary skill in the art. The NetFlow and/or the syslog can be notified of the first log including the metadata of the first set of rules.

At step 510, the method 500 can include providing, from the network device, the first log to a cloud-log store by the NetFlow of the network device, the cloud-log store receiving the first log from the network device and a second log from the firewall. In other instances, the method 500 can include providing, from the network device, the first log to a cloud-log store by a syslog of the network device or any other mechanism suitable for the intended purpose and understood by a person of ordinary skill in the art. The first log can also be provided to the cloud-log store by the NetFlow and/or syslog. The cloud-log store can receive the first log from the syslog of the network device and a second log from the firewall.

The method 500 can further include supplementing, by the NetFlow, the first log to include a marker that indicates a dropped flow. In some instances, the supplemented first log can further include at least one of flow telemetry, volume, or duration of a flow of network traffic.

Figure 6:
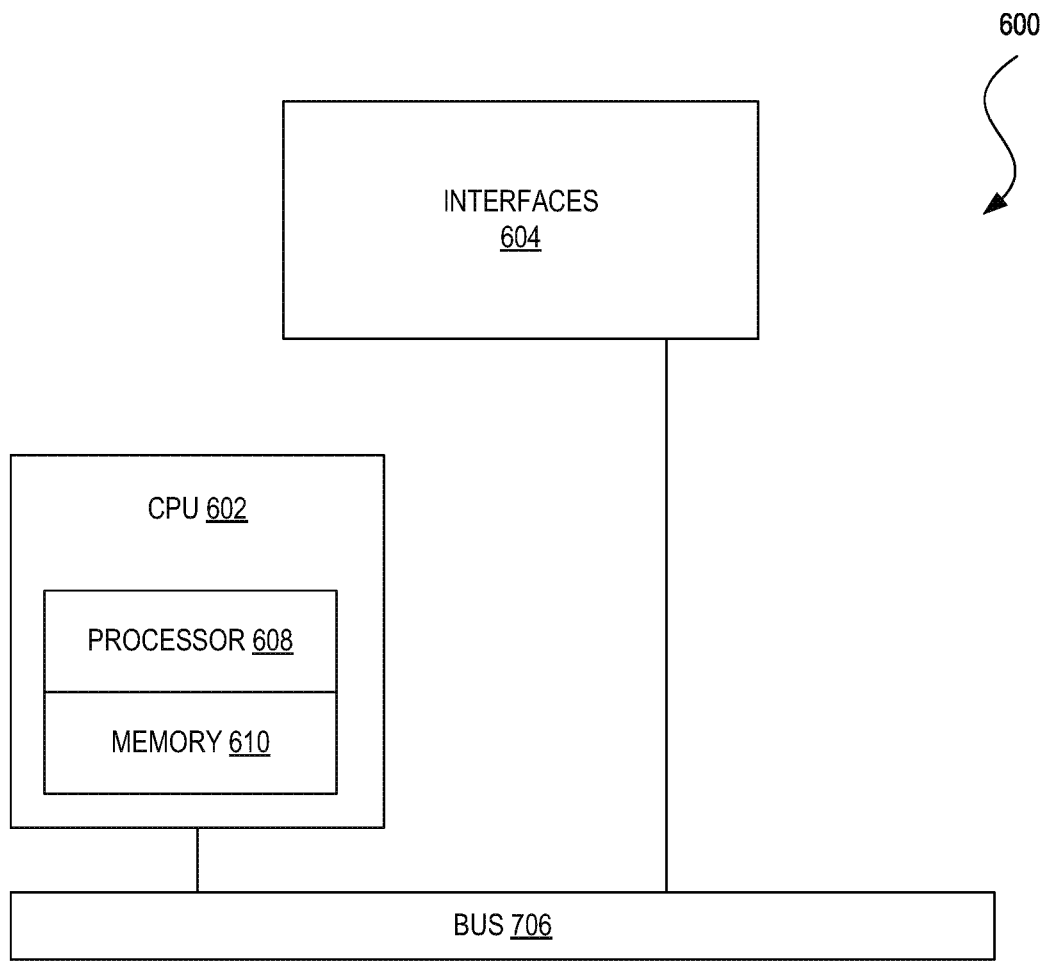
FIG. 6 illustrates an example of a network device, in accordance with some embodiments.

FIG. 6 further illustrates an example of a network device 600 (e.g., switch, router, network appliance, etc.). The network device 600 can include a master central processing unit (CPU) 602, interfaces 604, and a bus 606 (e.g., a PCI bus). When acting under the control of appropriate software or firmware, the CPU 602 can be responsible for executing packet management, error detection, and/or routing functions. The CPU 602 preferably accomplishes all these functions under the control of software including an operating system and any appropriate applications software. The CPU 602 may include one or more processors 608 such as a processor from the Motorola family of microprocessors or the MIPS family of microprocessors. In an alternative embodiment, the processor 608 can be specially designed hardware for controlling the operations of the network device 600. In an embodiment, a memory 610 (such as non-volatile RAM and/or ROM) can also form part of the CPU 602. However, there are many different ways in which memory could be coupled to the system.

An enterprise network can address the above and other security requirements with certain enhancements. For example, the enterprise network can create an International Mobile Subscriber Identity (IMSI) whitelist in in an Authentication, Authorization, and Accounting (AAA) server. In addition to SIM authentication, the enterprise network can maintain the AAA server containing the IMSIs of enterprise-provisioned devices. After initial authentication, a Packet Data Network Gateway (PGW) can validate the IMSI with the local device. The enterprise can also create a mapping of IMSIs to International Mobile Equipment Identities (IMEIs) for (non-embedded) SIM cards. The cloud-hosted authentication system can maintain a mapping between IMSIs and IMEIs. This mapping can be controlled by the enterprise network. This can ensure a binding between device and SIM. After authentication, the mobile core can request the IMEI. It can further check if the IMEI maps to IMSI. The enterprise network can also deploy Virtual Routing and Forwarding (VRFs) instances based on device policy. The PGW can tunnel user traffic to specific VRFs.

The interfaces 604 can be provided as interface cards (sometimes referred to as line cards). The interfaces 604 can control the sending and receiving of data packets over the network and sometimes support other peripherals used with the network device 600. Among the interfaces that may be provided are Ethernet interfaces, frame relay interfaces, cable interfaces, Digital Subscriber Line (DSL) interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 604 may include ports appropriate for communication with the appropriate media. In some cases, the interfaces 604 may also include an independent processor and, in some instances, volatile RAM. The independent processors may control communication intensive tasks such as packet switching, media control, and management. By providing separate processors for the communication intensive tasks, the interfaces 604 may allow the CPU 602 to efficiently perform routing computations, network diagnostics, security functions, and so forth.

Although the system shown in FIG. 6 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 600.

Regardless of the network device's configuration, it may employ one or more memories or memory modules (including the memory 610) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 7A:
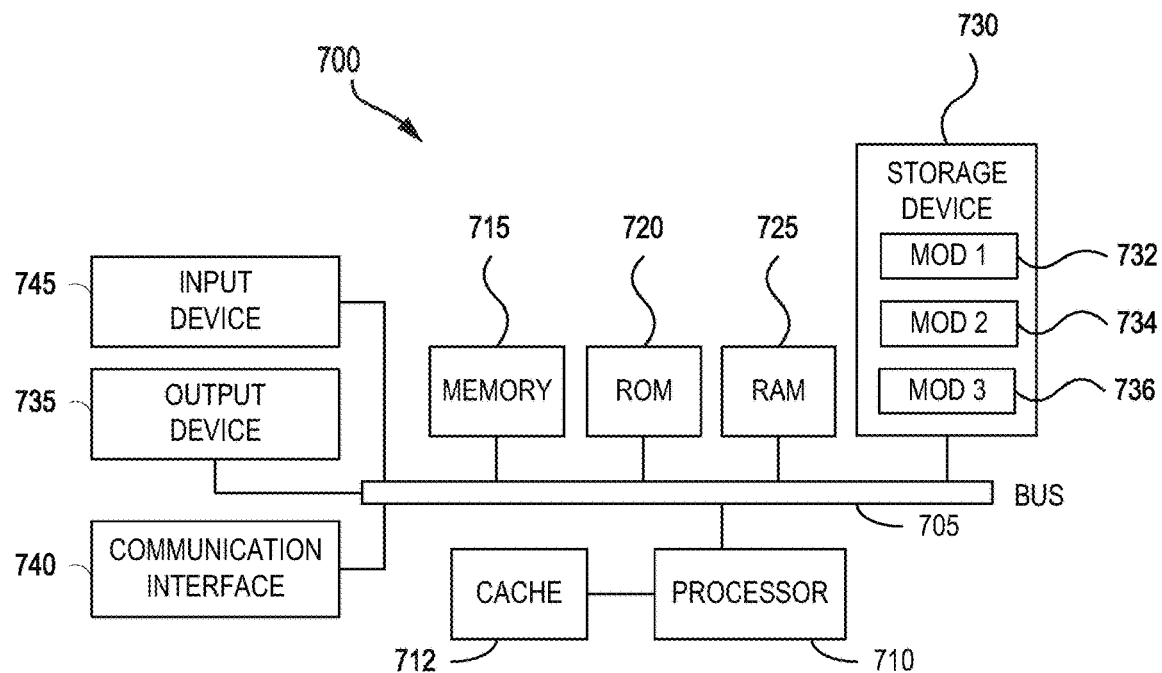
FIGS. 7A and 7B illustrate examples of systems, in accordance with some embodiments.
Figure 7B:
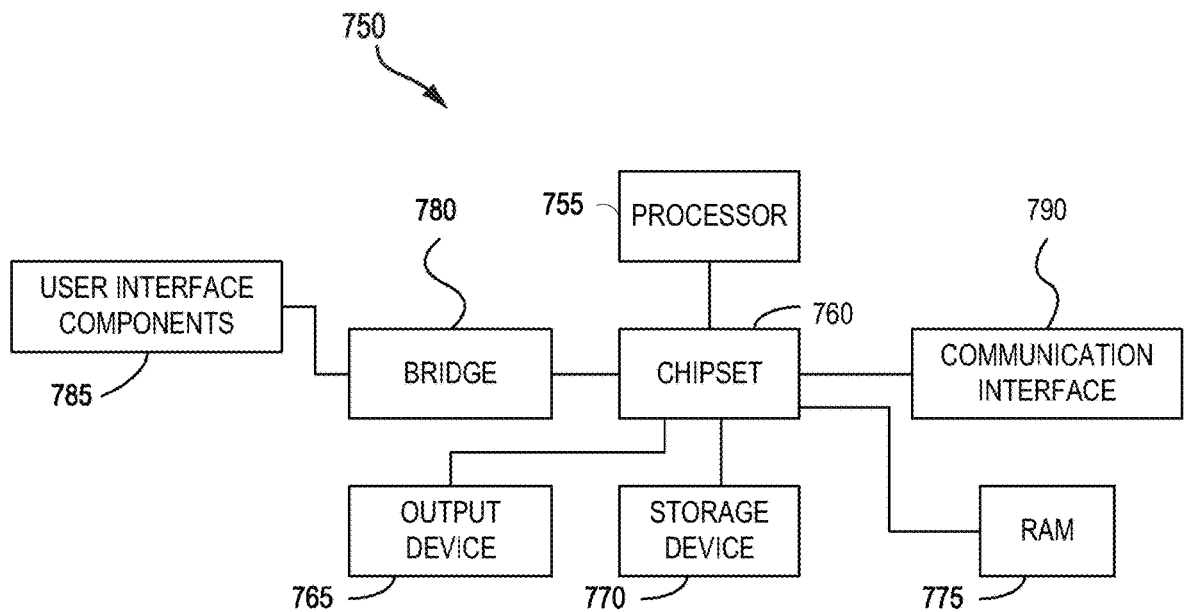

FIGS. 7A and 7B illustrate systems in accordance with various embodiments. The more appropriate system will be apparent to those of ordinary skill in the art when practicing the various embodiments. Persons of ordinary skill in the art will also readily appreciate that other systems are possible.

FIG. 7A illustrates an example of a bus computing system 700 wherein the components of the system are in electrical communication with each other using a bus 705. The computing system 700 can include a processing unit (CPU or processor) 710 and a system bus 705 that may couple various system components including the system memory 715, such as read only memory (ROM) 720 and random access memory (RAM) 725, to the processor 710. The computing system 700 can include a cache 712 of high-speed memory connected directly with, in close proximity to, or integrated as part of the processor 710. The computing system 700 can copy data from the memory 715, ROM 720, RAM 725, and/or storage device 730 to the cache 712 for quick access by the processor 710. In this way, the cache 712 can provide a performance boost that avoids processor delays while waiting for data. These and other modules can control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in the storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and therefore the basic features here may easily be substituted for improved hardware or firmware arrangements as they are developed.

The storage device 730 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 730 can include the software modules 732, 734, 736 for controlling the processor 710. Other hardware or software modules are contemplated. The storage device 730 can be connected to the system bus 705. In some embodiments, a hardware module that performs a particular function can include a software component stored in a computer-readable medium in connection with the necessary hardware components, such as the processor 710, bus 705, output device 735, and so forth, to carry out the function.

FIG. 7B illustrates an example architecture for a chipset computing system 750 that can be used in accordance with an embodiment. The computing system 750 can include a processor 755, representative of any number of physically and/or logically distinct resources capable of executing software, firmware, and hardware configured to perform identified computations. The processor 755 can communicate with a chipset 760 that can control input to and output from the processor 755. In this example, the chipset 760 can output information to an output device 765, such as a display, and can read and write information to storage device 770, which can include magnetic media, solid state media, and other suitable storage media. The chipset 760 can also read data from and write data to RAM 775. A bridge 780 for interfacing with a variety of user interface components 785 can be provided for interfacing with the chipset 760. The user interface components 785 can include a keyboard, a microphone, touch detection and processing circuitry, a pointing device, such as a mouse, and so on. Inputs to the computing system 750 can come from any of a variety of sources, machine generated and/or human generated.

The chipset 760 can also interface with one or more communication interfaces 790 that can have different physical interfaces. The communication interfaces 790 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 755 analyzing data stored in the storage device 770 or the RAM 775. Further, the computing system 750 can receive inputs from a user via the user interface components 785 and execute appropriate functions, such as browsing functions by interpreting these inputs using the processor 755.

It will be appreciated that computing systems 700 and 750 can have more than one processor 710 and 755, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method for leveraging a network to distribute stateless security functions comprising:
   receiving, at a network device, a first set of rules from a security controller of an enterprise network, the first set of rules being different from a second set of rules provided to a firewall by the security controller;
   implementing, at the network device, the first set of rules received from the security controller;
   generating, at the network device, a first log including metadata based on the first set of rules, the first log being generated on a per flow basis, wherein the first log is generated for a first flow regardless of a quantity of packets included in the first flow;
   notifying, at the network device, a hardware network flow logger of the first log including the metadata based on the first set of rules, wherein the hardware network flow logger generates a hardware generated record to provide a reliable logging during a high rate network traffic; and
   providing, from the hardware network flow logger of the network device, the first log to a cloud-log store, the cloud-log store receiving the first log from the hardware network flow logger of the network device and a second log from the firewall.

2. The computer-implemented method of claim 1, wherein the first set of rules is routed from the security controller and through a network controller to the network device.

3. The computer-implemented method of claim 1, wherein the first set of rules of the network device and the second set of rules of the firewall divide network traffic to offload the firewall, drop network traffic to a closest source, or increase scale.

4. The computer-implemented method of claim 1, wherein the implementing of the first set of rules occurs at a security access control list stage of the network device.

5. The computer-implemented method of claim 4, wherein the security access control list stage notifies the hardware network flow logger of the first log.

6. The computer-implemented method of claim 1, further comprising supplementing, by the hardware network flow logger, the first log to include a marker that indicates a dropped flow.

7. The computer-implemented method of claim 6, wherein the supplemented first log further includes at least one of flow telemetry, volume, or duration of a flow of network traffic.

8. A system comprising:
   one or more hardware processors; and
   at least one computer-readable storage medium having stored therein instructions which, when executed by the one or more hardware processors, cause the system to:
   receive, at a network device, a first set of rules from a security controller of an enterprise network, the first set of rules being different from a second set of rules provided to a firewall by the security controller;
   implement, at the network device, the first set of rules received from the security controller;
   generate, at the network device, a first log including metadata based on the first set of rules, the first log being generated on a per flow basis, wherein the first log is generated for a first flow regardless of a quantity of packets included in the first flow;
   notify, at the network device, a hardware network flow logger of the first log including the metadata based on the first set of rules, wherein the hardware network flow logger generates a hardware generated record to provide a reliable logging during a high rate network traffic; and
   provide, from the hardware network flow logger of the network device, the first log to a cloud-log store, the cloud-log store receiving the first log from the hardware network flow logger of the network device and a second log from the firewall.

9. The system of claim 8, wherein the first set of rules is routed from the security controller and through a network controller to the network device.

10. The system of claim 8, wherein the first set of rules of the network device and the second set of rules of the firewall divide network traffic to offload the firewall, drop network traffic to a closest source, or increase scale.

11. The system of claim 8, wherein the implementation of the first set of rules occurs at a security access control list stage of the network device.

12. The system of claim 11, wherein the security access control list stage notifies the hardware network flow logger of the first log.

13. The system of claim 8, wherein the instructions which, when executed by the one or more processors, cause the system to supplement, by the hardware network flow logger, the first log to include a marker that indicates a dropped flow.

14. The system of claim 13, wherein the supplemented first log further includes at least one of flow telemetry, volume, or duration of a flow of network traffic.

15. A non-transitory computer-readable storage medium comprising:
  instructions stored on the non-transitory computer-readable storage medium, the instructions, when executed by one or more hardware processors, cause the one or more hardware processors to:
    receive, at a network device, a first set of rules from a security controller of an enterprise network, the first set of rules being different from a second set of rules provided to a firewall by the security controller;
    implement, at the network device, the first set of rules received from the security controller;
    generate, at the network device, a first log including metadata based on the first set of rules, the first log being generated on a per flow basis, wherein the first log is generated for a first flow regardless of a quantity of packets included in the first flow;
    notify, at the network device, a hardware network flow logger of the first log including the metadata based on the first set of rules, wherein the hardware network flow logger generates a hardware generated record to provide a reliable logging during a high rate network traffic; and
    provide, from the hardware network flow logger of the network device, the first log to a cloud-log store, the cloud-log store receiving the first log from the hardware network flow logger of the network device and a second log from the firewall.

16. The non-transitory computer-readable storage medium of claim 15, wherein the first set of rules is routed from the security controller and through a network controller to the network device.

17. The non-transitory computer-readable storage medium of claim 15, wherein the first set of rules of the network device and the second set of rules of the firewall divide network traffic to offload the firewall, drop network traffic to a closest source, or increase scale.

18. The non-transitory computer-readable storage medium of claim 15, wherein the implementation of the first set of rules occurs at a security access control list stage of the network device.

19. The non-transitory computer-readable storage medium of claim 18, wherein the security access control list stage notifies the hardware network flow logger of the first log.

20. The non-transitory computer-readable storage medium of claim 15, wherein the instructions, when executed by the one or more processors, cause the one or more processors to supplement, by the hardware network flow logger, the first log to include a marker that indicates a dropped flow, wherein the supplemented first log further includes at least one of flow telemetry, volume, or duration of a flow of network traffic.

* * * * *